Patented Sept. 21, 1948

2,449,724

UNITED STATES PATENT OFFICE 2,449,724

MANUFACTURE OF AMIDINES

Wallace Frank Short and Maurice William Partridge, Nottingham, England

No Drawing. Application March 8, 1948, Serial No. 13,744. In Great Britain July 11, 1945

3 Claims. (Cl. 260—564)

This invention relates to the production of compounds containing the amidine grouping

and derived from di-nitriles having the general formula

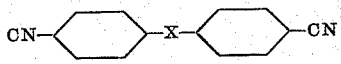

where X is a group from the class consisting of —O— and —O(CH₂)₃O—.

According to the invention, ammonium thiocyanate is heated with a di-nitrile, as aforesaid, at a temperature such that an amidine thiocyanate of the general formula

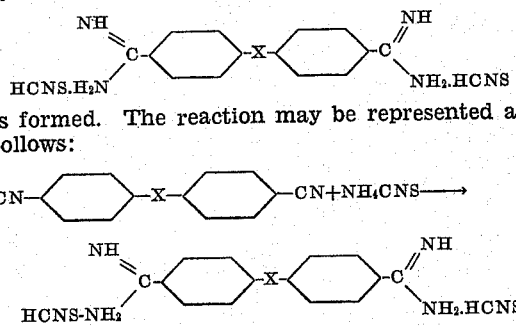

is formed. The reaction may be represented as follows:

X having the significance indicated above. As has been stated, the product of the reaction is a di-thiocyanate of a di-amidine but it will be understood that the amidine itself may be liberated from the thiocyanate by methods known per se and the amidine may be converted into other salts by methods also known per se.

The temperature at which the reaction between the nitrile and the thiocyanate or the like is carried out is obviously dependent on the temperature at which the thiocyanate of the amidine will decompose and it has been found that in most cases a satisfactory temperature is about 180° C., but in some of the cases the reaction proceeds satisfactorily at as high a temperature as 240° C.

The reacting substances may be directly heated together or in some cases may be dissolved in a solvent, for which purpose glycerol, for example, has been found to be suitable.

In order that the invention may be understood and readily carried into effect, the following examples are given.

Example 1

In the preparation of 4:4'-diamidino-α:γ-diphenoxypropane hydrochloride, 5.6 parts by weight of 4:4'-dicyano-α:γ-diphenoxypropane and 12.2 parts by weight of ammonium thiocyanate are heated together, with vigorous mechanical stirring, at 190–195° C. for one hour and 180° C. for a further two hours. The product is cooled and dissolved in hot water. The solution is poured into a vigorously stirred mixture of sodium hydroxide solution and ice. The solid, which is precipitated, is digested with dilute acetic acid; the mixture is filtered, and the filtrate is made alkaline with sodium hydroxide. The precipitate is collected, washed with water, suspended in water and neutralised with dilute hydrochloric acid. The resulting solution is decolourised with charcoal and mixed with a large volume of acetone. The crystals which separate are recrystallised from 5 per cent ammonium chloride solution to obtain 4:4'-diamidino-α:γ-diphenoxypropane hydrochloride as fine needles of melting point 289–290° C. The free amidine, having a melting point of 190° C. with decomposition, is precipitated from an aqueous solution of the hydrochloride on adding the theoretical amount of aqueous sodium hydroxide.

Example 2

In the preparation of pp'-diamidinodiphenyl ether dihydrochloride dihydrate a mixture of 22 g. of pp'-dicyanodiphenyl ether and 60 g. of ammonium thiocyanate is heated with stirring at a temperature of 180° C. for 6 hours. After cooling, the product is boiled with 50 cc. of water and the mixture is filtered, the solid residue is boiled with 25 cc. of water and the mixture is filtered. The combined aqueous filtrates are added with stirring to a mixture of 100 g. of ice and 100 cc. of 5 N sodium hydroxide solution. The precipitate is filtered off, washed with water and is then suspended in 200 cc. of water and 5 N hydrochloric acid is added with stirring until the pH of the solution is 7. The solution is then stirred with 1 g. of decolourising charcoal and filtered and the aqueous filtrate is mixed with 10 volumes of acetone. pp'-diamidino-diphenyl ether dihydrochloride dihydrate is thereby precipitated in the form of crystals.

The present application is a continuation-in-part of our application Serial No. 682,138, filed July 8, 1946, now abandoned.

We claim:

1. A process for the preparation of a thiocyanate salt of an amidine of the formula

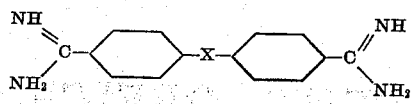

which comprises heating a dinitrile of the formula

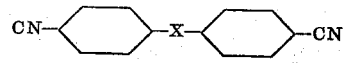

with ammonium thiocyanate to a temperature of the order of 180–240° C., X being a member of the group consisting of —O— and —O(CH$_2$)$_3$O—.

2. Process as defined in claim 1, wherein the dinitrile is p:p'-dicyanodiphenyl ether.

3. Process as defined in claim 1, wherein the dinitrile is 4:4'-dicyano-α:γ-diphenoxy propane.

WALLACE FRANK SHORT.
MAURICE WILLIAM PARTRIDGE.

REFERENCES CITED

The following references are of record in the file of this patent:

UNITED STATES PATENTS

| Number | Name | Date |
|---|---|---|
| 2,007,770 | Prochnow | July 9, 1935 |
| 2,204,983 | Ewins et al. | June 18, 1940 |
| 2,277,862 | Ewins et al. | Mar. 31, 1942 |

OTHER REFERENCES

Shriner et al., "Chemical Reviews," Dec., 1944, page 363.